United States Patent [19]

Sims

[11] Patent Number: 5,791,614
[45] Date of Patent: Aug. 11, 1998

[54] HEAD REST MOUNTED HANGER

[75] Inventor: Curtis J. Sims, Clarkston, Mich.

[73] Assignee: Chrysler Corporation, Auburn Hills, Mich.

[21] Appl. No.: 632,199

[22] Filed: Apr. 15, 1996

[51] Int. Cl.⁶ ........................................... B60R 7/00
[52] U.S. Cl. .............. 248/230.7; 224/275; 248/231.81; 248/304; 297/188.04
[58] Field of Search .......................... 248/230.7, 231.81, 248/304; 224/275; 297/188.01, 188.04, 188.06, 188.2

[56] References Cited

U.S. PATENT DOCUMENTS

| | | |
|---|---|---|
| 2,582,650 | 1/1952 | Patton . |
| 3,972,499 | 8/1976 | Simmons ........................ 248/304 X |
| 4,302,046 | 11/1981 | Lazazzero . |
| 4,681,366 | 7/1987 | Lobanoff . |
| 4,757,928 | 7/1988 | Browne . |
| 4,792,183 | 12/1988 | Townsend, III . |
| 4,821,988 | 4/1989 | Jimenez ........................ 248/230.7 X |
| 4,842,230 | 6/1989 | Cobb et al. ........................ 248/304 X |
| 4,957,230 | 9/1990 | Gonzales . |
| 4,971,393 | 11/1990 | Maisenhalder ........................ 248/118 X |
| 5,000,210 | 3/1991 | Worthington, Jr. ........... 248/231.81 X |
| 5,058,790 | 10/1991 | LaVelle ........................ 224/275 |
| 5,226,576 | 7/1993 | Ellsworth . |
| 5,383,588 | 1/1995 | Kazel ........................ 224/275 |
| 5,415,457 | 5/1995 | Kifer ........................ 297/188.04 |

FOREIGN PATENT DOCUMENTS

| | | | |
|---|---|---|---|
| 5-221269 A | 8/1993 | Japan ........................ 224/275 |
| 2239639 | 7/1991 | United Kingdom ........................ 224/275 |
| 91/08928 | 6/1991 | WIPO ........................ 224/275 |
| 93/25411 | 12/1993 | WIPO ........................ 224/275 |

Primary Examiner—Ramon O. Ramirez
Assistant Examiner—Derek J. Berger
Attorney, Agent, or Firm—Thomas G. Pasternak

[57] ABSTRACT

A head rest mounted hanger comprising a plurality of hanging means connected to a hanger body and post grooves for engagement with the head rest posts of a seat head rest.

3 Claims, 4 Drawing Sheets

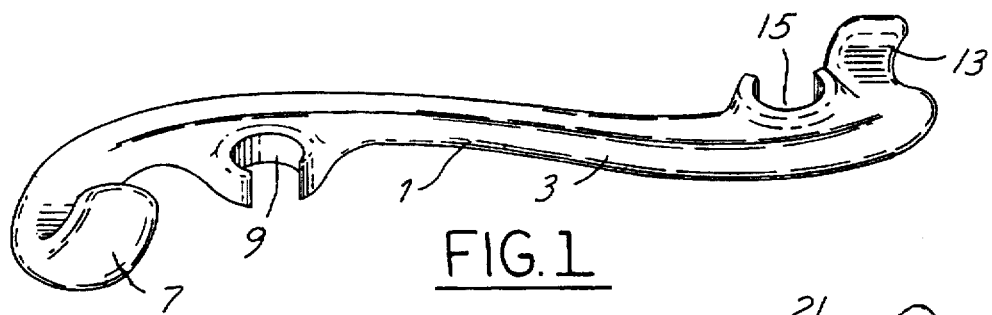
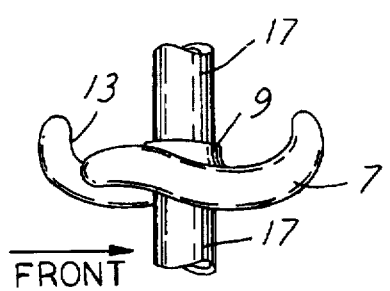
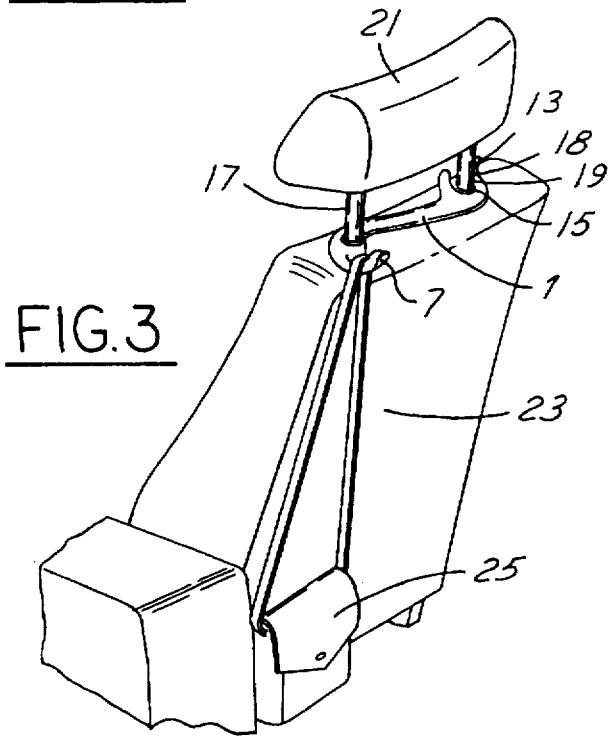
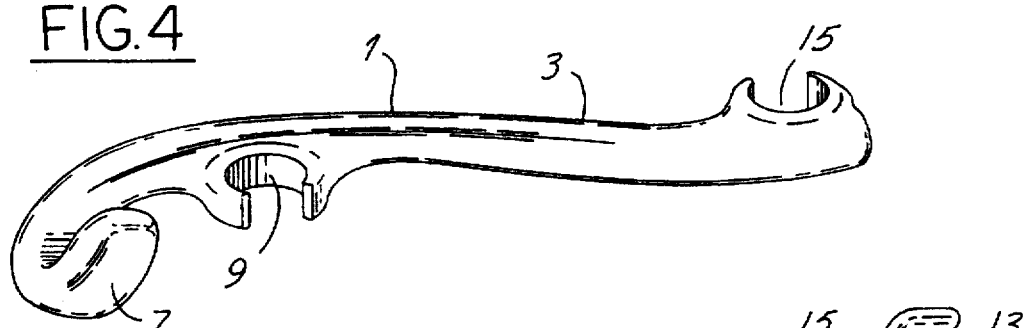
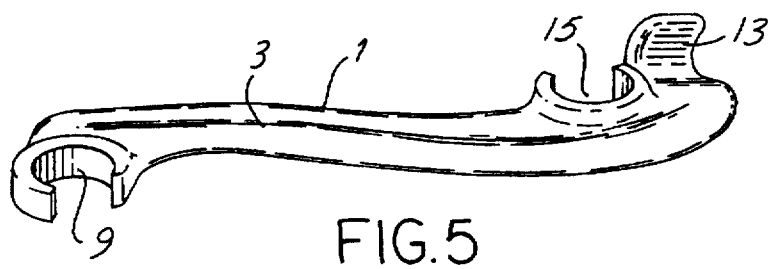

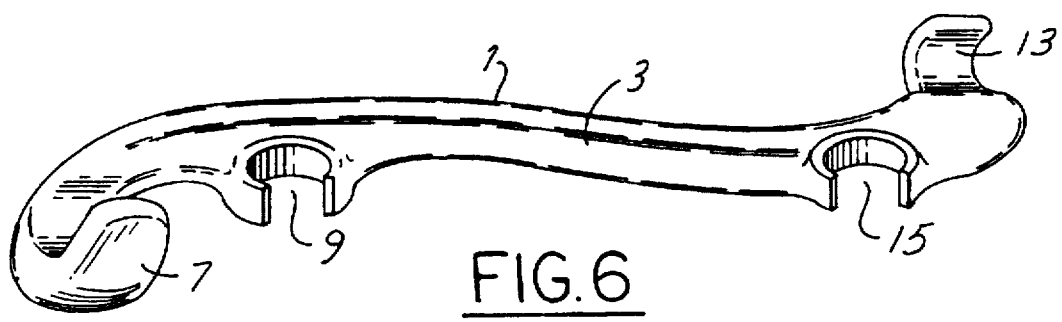
FIG.6
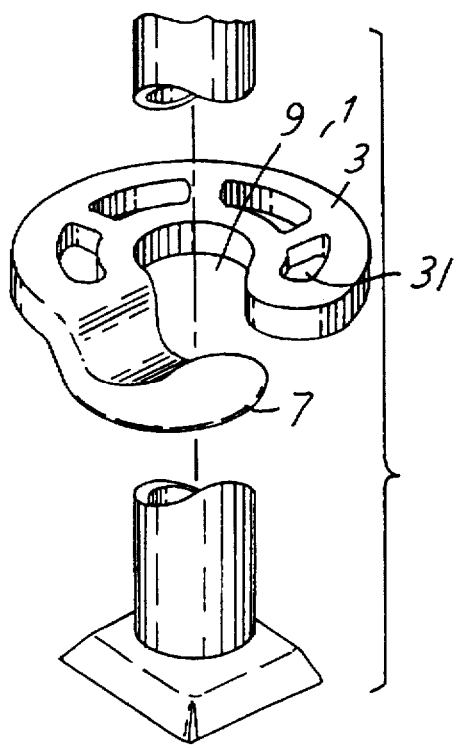
FIG.7
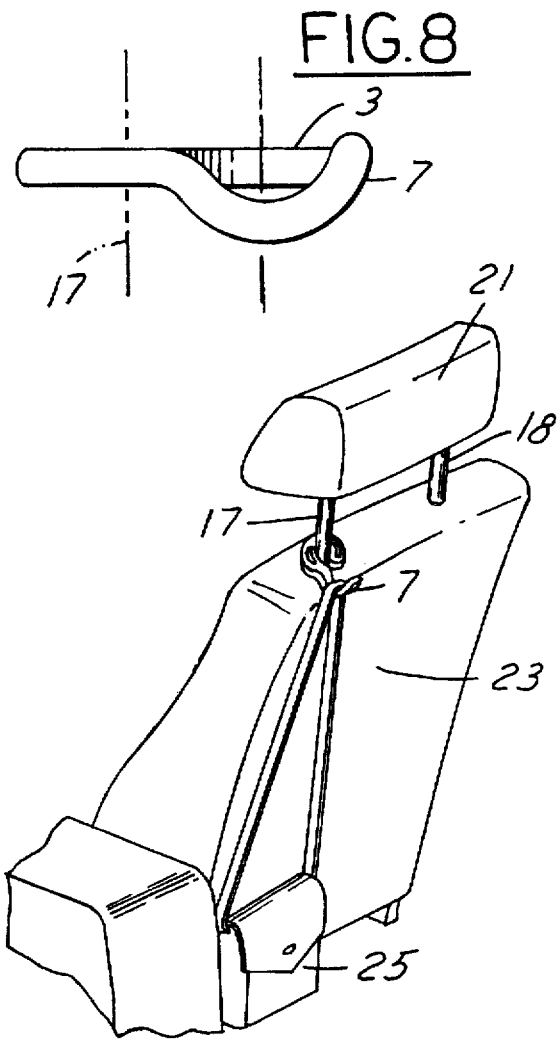
FIG.8
FIG.9

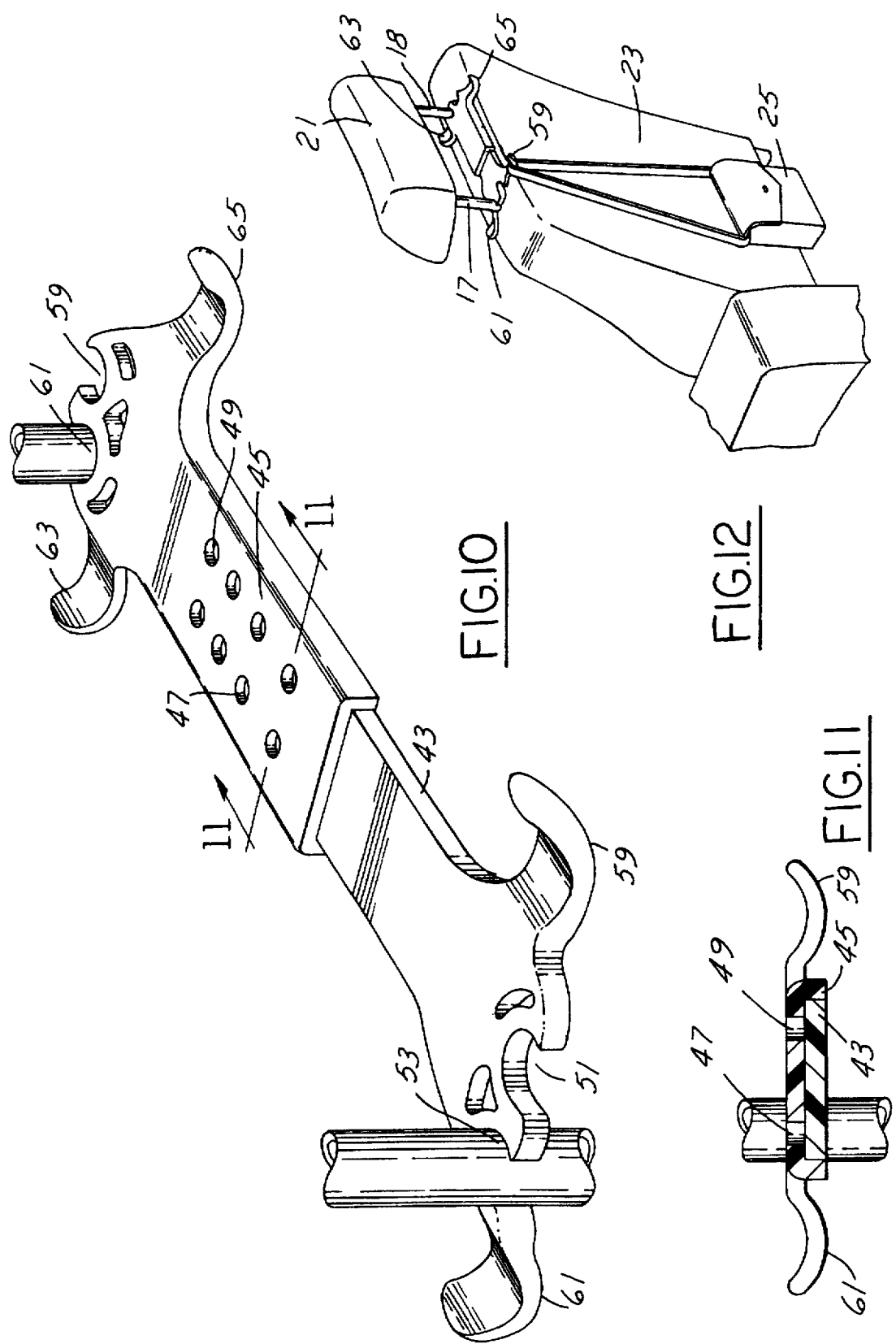

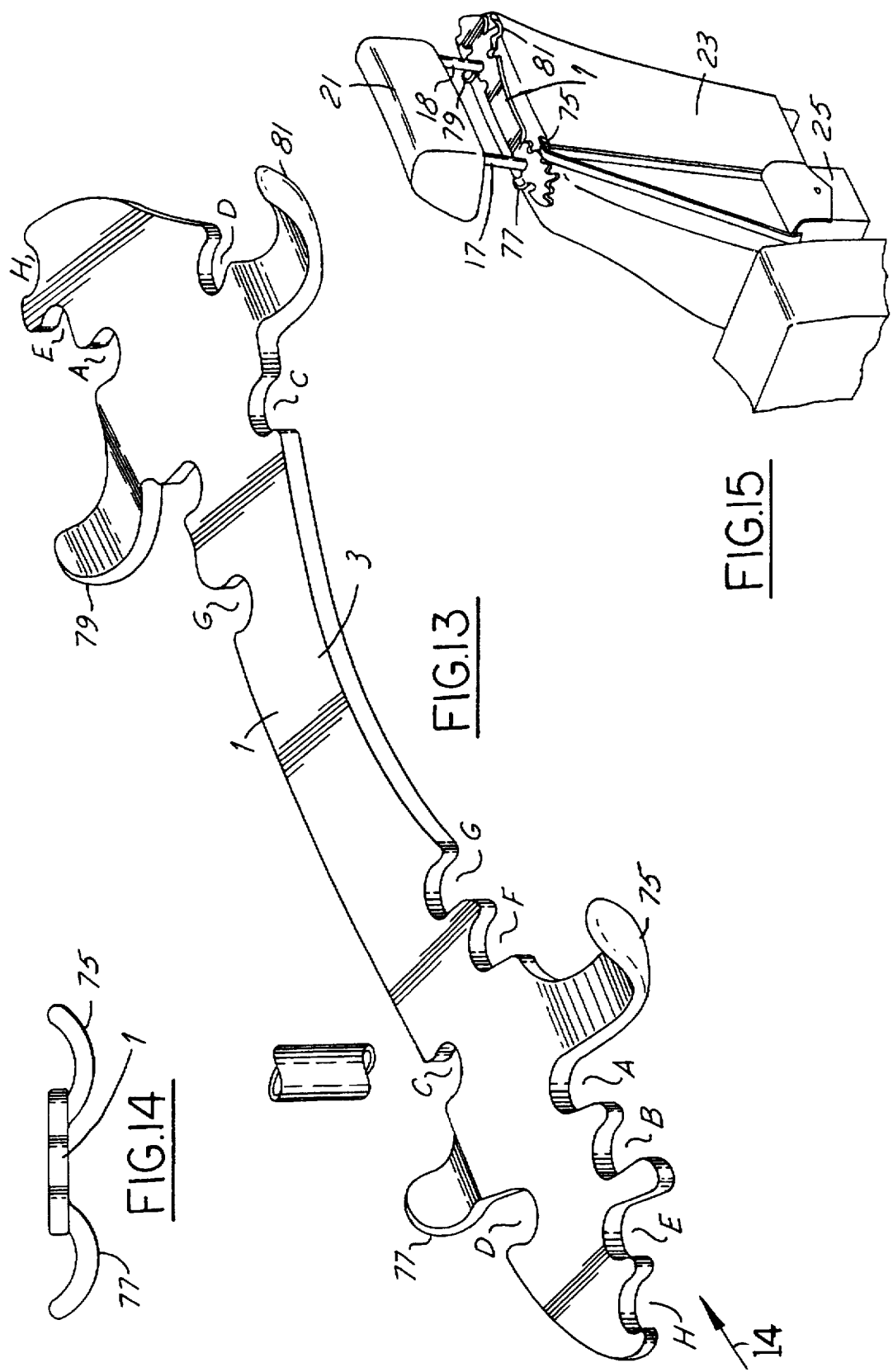

HEAD REST MOUNTED HANGER

BACKGROUND OF THE INVENTION

1. Field of the Invention

The present invention relates to an accessory for use with seats having headrests mounted thereon via one or more head rest posts. Such seats have various applications and may be found in various modes of transportation such as automobiles, trains, buses, and aircraft, and elsewhere. The present invention more particularly relates to an apparatus which is mounted to one or more head rest posts of a headrest for hanging articles such as purses, backpacks, dry-cleaned clothes on hangers, and shopping bags.

2. Background of the Invention

Those traveling in automobiles or on public transportation frequently carry various articles, such as purses, backpacks, dry-cleaned clothes on hangers, shopping bags, and various other articles. Automobiles and other forms of transportation generally do not provide a satisfactory way to hang or store these hand-carried articles. Such articles therefore must be placed on the floor of the vehicle or on an adjacent or adjoining seat. This often is not satisfactory because it is desirous that the article is kept off the floor to avoid breaking and to avoid contact with dirt, water and snow. It also often is desirous that the article not be allowed to interfere with the passengers in the facing or adjacent seats. Hangers mounted on the instrument panel of an automobile do not solve this problem. Since instrument panel-mounted hangers generally are low, the hanging articles generally extend onto the floor and interfere with the passenger's legs. Articles placed on the passenger seat of an automobile or on the rear seats similarly interfere with passengers. Finally, it often is desirable that articles be kept within easy access to the driver. For example, in the case of a purse, this is desirable so that change for tolls may easily be obtained.

Accordingly, there exists a need for a hanger that solves these problems.

SUMMARY OF THE INVENTION

The present invention is a head rest mounted hanger mounted to one or both head rest posts of a head rest of a seat. The head rest mounted hanger comprises a plurality of hanging means. It is an object of the present invention to provide a hanger which can be transferred between various seats and used in a variety of applications, for example, in more than one type of automobile or in various forms of transportation. It is another object of the present invention to provide a hanger that may be easily manufactured. It is another object of the present invention to provide a hanger that keeps articles off of the floor and that keeps articles from interfering with passengers.

These and other objects of the present invention are described in greater detail in the detailed description of the invention and the attached drawings and claims.

DESCRIPTION OF THE DRAWINGS

For a more complete understanding of this invention reference should now be made to the embodiments illustrated in greater detail in the accompanying drawings and described below.

FIG. 1 is an isometric view of the preferred embodiment of the present invention.

FIG. 2 is a side view of the preferred embodiment of the present invention, shown installed on the head rest posts of a seat.

FIG. 3 is a perspective view of the preferred embodiment of the present invention, shown installed on the head rest posts of the passenger seat of an automobile.

FIG. 4 is a an isometric view of a second embodiment of the present invention.

FIG. 5 is an isometric view of a third embodiment of the present invention.

FIG. 6 is an isometric view of a fourth embodiment of the present invention.

FIG. 7 is an isometric view of a fifth embodiment of the present invention.

FIG. 8 is a side view of the fifth embodiment of the present invention, shown installed on the head rest posts of a seat.

FIG. 9 is a perspective view of the fifth embodiment of the present invention, shown installed on the passenger seat of an automobile.

FIG. 10 is an isometric view of a sixth embodiment of the present invention.

FIG. 11 is a cross-section of the adjustment means of the sixth embodiment of the present invention.

FIG. 12 is a perspective view of a sixth embodiment of the present invention, shown installed on the passenger seat of an automobile.

FIG. 13 is an isometric view of a seventh embodiment of the present invention.

FIG. 14 is a side view of the seventh embodiment of the present invention, shown installed on the head rest posts of a seat.

FIG. 15 is a perspective view of a seventh embodiment of the present invention, shown installed on the passenger seat of an automobile.

DETAILED DESCRIPTION OF THE INVENTION

The present invention is a head rest mounted hanger which is designed to be installed on the head rest posts of a seat head rest. Seats with head rests typically are found in automobiles and sometimes in public transportation, and elsewhere. The head rests typically, but not always, are adjustable in the vertical direction via two head rest posts which are connected to the head rest and which slide into the seat back. The present invention may be used with any such head rest, whether it is adjustable or fixed and whether it comprises one or more head rest posts.

There is no standard dimension associated with the head rest posts. At Chrysler Corporation, the posts typically are 10–12 mm in diameter and are separated by 150–240 mm. The head rest mounted hanger may be installed in new vehicles or installed later as an accessory item. It also may be transferred from vehicle to vehicle and seat to seat, and may be used if desired in seats with head rests which are used in non-transportation applications.

Throughout this detailed description, like reference numerals are used to refer to the same element of the invention shown in multiple figures thereof. Turning first to FIG. 1, the preferred embodiment of the present invention, a head rest mounted hanger is shown. Head rest mounted hanger 1 comprises hanger body 3 which is integrally molded (or otherwise suitably connected) to first hanging means 7. In the preferred embodiment and all of the embodiments discussed herein, the hanging means are shallow upturned hooks in shape. Any suitable geometry may be used for the hanging means, however, although it generally is preferred that the hanging means have a slight upward tilt to prevent articles from slipping off, or that it comprise other means of securing hanging articles, such as slight ridges or other means. In the preferred embodiment the head rest mounted hanger itself has a shallow "S" shape, but, again, any suitable geometry may be used. Head rest mounted hanger 1 preferably is made of an injection-moldable plastic such as ABS (acrylonitrile-butadiene-styrene polymer), PC/ABS (polycarbonate/acrylonitrile-butadiene-styrene polymer), or polypropylene, but may be made of any suitable material. The one piece molded construction of the preferred embodiment offers ease of manufacture.

First post groove 9 is integrally molded (or otherwise suitably connected) to hanger body 3. The point of attachment of the first post groove to the hanger body is determined by the dimensions of the head rest to which the hanger is to be attached, and it may be connected to the hanger body at any suitable location along the hanger body. First post groove 9 is sized for forced frictional engagement with one head rest post of a head rest. Head rest posts are manufactured in a variety of diameters. Chrysler Corporation head rest posts generally are 10 mm or 12 mm in diameter, but the present invention is equally as applicable to head rest posts of any dimension. The first post groove may be sized to fit any size head rest post desired, and preferably is sized to be slightly smaller than the corresponding post such that a forced fit exists between the groove and the post, with the groove "snapped" into place on the post. This forced engagement in the preferred embodiment is facilitated by the resiliency of the material of manufacture.

As also is shown in FIG. 1, the preferred embodiment of the present invention further comprises second hanging means 13, which also is integrally molded or otherwise suitably connected to hanger body 3. Second post groove 15 also is integrally molded to hanger body 3, and in the preferred embodiment is located on the opposite side of the hanger body from first post groove 9. It may be attached on the same side as the first post groove, or at any suitable location. As with the first post groove, the point of attachment to the hanger body is determined by the separation of the head rest posts to which the hanger is to be attached. The second post groove in the preferred embodiment otherwise is identical in all respects to the first post groove, and is sized for forced frictional engagement with a second head rest post. It need not be identical, however, for example, if one post of a head rest is of one dimension and a second post is of a second dimension, the post grooves necessarily will be of different dimensions.

The first and second grooves of the preferred embodiment are preferably between 150 and 240 mm apart, which generally is the range of separation of the posts used with Chrysler vehicle head rests. The grooves may be separated by whatever distance desired to fit the desired application. Since there is no standard separation, a variety of different separate distances may be desirable.

Turning to FIG. 2, the preferred embodiment of the present invention is shown installed (in side view) on two posts of a head rest. First post groove 9 engages first head rest post 17 (not claimed), second post groove 15 engages second head rest post 18 (not claimed), first hanging means 7 projects towards the rear of the seat, and second hanging means 13 projects towards the front of the seat.

To install the head rest mounted hanger, head rest mounted hanger 1 is snapped into place over the two head rest posts 17 and 19 of head rest 21 (the posts and the head rest are not part of the claimed invention) such that first hanger means 7 projects to the rear of seat 23 (also not part of the claimed invention) and second hanger means 13 projects forward from seat 23. In FIG. 3, the preferred embodiment of the present invention can be seen installed on the passenger seat of an automobile. Its applicability is not so limited, but it can be seen that when used in this manner the driver of the automobile can easily hang purse 25 (not claimed) so that it hangs downwardly from the head rest mounted hanger installed on the adjacent passenger seat towards the floor of the automobile so that it is not touching the floor, which may be dirty, wet, or snow-covered, and yet the purse still is accessible to the driver. The purse also is out of the way of both the front and rear seat passengers and the driver. Second hanging means 13' projects forwards and also may be used for hanging articles, which in that case would hang down into the passenger seat. The preferred embodiment provides for hanging articles in front of or behind a seat, and for attachment to both head rest posts. This is but one manner of utilizing the claimed invention, depending on the desired use and also on the appearance of the hanger that is desired. Any desired number of hanging means may be used, in any desired combination.

Alternate embodiments of the present invention are shown in FIG. 4, FIG. 5, and FIG. 6. These embodiments include: 1) a second embodiment comprising a single hanging means (FIG. 4); 2) a third embodiment comprising a single hanging means, but in a different location than in the second embodiment (FIG. 5); and 3) a fourth embodiment comprising first and second post grooves located on the same side of the hanger body (FIG. 6), as opposed to on opposite sides as in the preferred embodiment.

The second embodiment comprises head rest mounted hanger 1 which further comprises hanger body 3, hanger body 7, first post groove 9, and second post groove 15. The third embodiment comprises head rest mounted hanger 1 which further comprises hanger body 3 first post groove 9, post groove 15, and hanging means 13. The fourth embodiment comprises head rest mounted hanger 1 which further comprises hanger body 3, first hanging means 7, first post groove 9, second post groove 15, and second hanging means 13. As is apparent, any suitable combination of hanging means and attachment points may be used.

A fifth embodiment of the present invention is shown in FIG. 7. This embodiment comprises a single hook design for engaging a single head rest post. Head rest mounted hanger 1 comprises single post groove 9 integrally molded (or otherwise suitably connected) to hanger body 3, which in turn is integrally molded or otherwise suitably connected to hanging means 7. Cutouts 31 are molded into hanger body 3 to aid in flexing of the hanger body during installation of the hanger body on the head rest post. The cutouts may be of any appropriate shape and number. They are not required, but may be used, and also may be used in the preferred or any other embodiment of the present invention, if desired.

The fifth embodiment is shown in side view in FIG. 8. Single post groove 9 engages post 17 of the head rest and single hanging means 7 projects to the rear. The dimensions of the post groove are preferably as previously described. If desired this embodiment may also be configured such that the single hanging means projects to the front of the seat, and the embodiment may be attached to either post, as desired.

FIG. 9 shows the fifth embodiment of the present invention installed on the passenger seat of an automobile, with single hanging means 7 projecting to the rear. Purse 25 (not claimed) hangs from simple hanging means 7.

FIG. 10 shows a sixth embodiment of the present invention, an adjustable head rest mounted hanger. As previously discussed, the separation between the head rest posts of various seats is not the same even when seats manufactured by the same manufacturer are compared, when seats used in automobiles of different manufacturers are compared, or when seats used in trains, buses and aircraft are compared to various automobile seats. This embodiment of the present invention provides a solution to that problem by providing a head rest mounted hanger in which the separation between the post grooves is adjustable.

Head rest mounted hanger 1 comprises inner member 43 which is slidably engaged within outer member 45. The fit between inner member 43 and outer member 45 is close enough such that they are in a slidable frictional relation, that is, some amount of force must be applied to move the two pieces with respect to one another, to allow for adjustment of the two with respect to one another. The two pieces do not fit so tightly together that an excessive amount of force is required for adjustment, but the fit is tight enough so that they will not slide apart absent some force being applied. Head rest mounted hanger 1 in this embodiment further comprises adjustment means 45 which in this embodiment further comprises a plurality of pins 47 integrally molded or otherwise suitably attached to inner member 43 and a plurality of recesses 49 integrally defined by outer member 45. Adjustment means 45 need not be present, however, as the frictional fit between the two members can be designed such that it is sufficient to control the spacing of the inner and outer members. The adjustment means provides for a stronger binding between the two pieces, if that is desired. Moreover, if an adjustment means is desired to be used, any suitable means of engagement may be utilized, as there are many ways to provide such an adjustment. In this embodiment of the present invention, male pins 47 engage and move into female recesses 49 as inner member 43 is slid into outer member 45. Correspondingly, the pins are of sufficient height and the recesses are of sufficient depth such that, once corresponding pins and recesses are engaged, some force is required to overcome the engagement. Thus, the adjustment means aids in keeping the two parts connected and maintaining the separation of the two members, preventing them from sliding further apart or closer together due to the weight of an article. More separation force is required than if they were engaged solely by frictional engagement. The details of the adjustment means are shown in cross-section in FIG. 11.

This embodiment of the present invention also comprises an additional feature which may be utilized in other embodiments as well—post grooves of different dimensions. Inner member 41 comprises first post groove 51 and third post groove 53, one (51) 10 mm in diameter, the second (53) 12 mm in diameter. Outer member 47 similarly comprises second and fourth post grooves 59 (10 mm) and 61 (12 mm) of two different diameters, which correspond in diameter to post grooves 51 and 53, respectively. Thus, in addition to being adjustable in length, this embodiment provides for installation of the head rest mounted hanger on head rest posts of two different dimensions. When the head rest mounted hanger is transferred between two different automobiles, the head rest posts may be of different diameters. The two sets of post grooves account for this. The adjustment of separation and the addition of multiple post grooves of different dimensions are features that may be used with many of the different embodiments of the present invention, as is desired.

Finally, this embodiment may comprise various numbers of hanging means, as is desired, as may the other embodiments. For example, head rest mounted hanger 1 as shown in this embodiment comprises hanging means 59, 61, 63, and 65, two on each end of the hanger, with two facing forward of the seat, and two facing back.

FIG. 12 shows a perspective view of the sixth embodiment of the present invention installed head rest mounted hanger 1 on the passenger seat of an automobile.

Turning to FIG. 13, a seventh embodiment of the present invention is shown, which, rather than providing for variation in the separation of the post grooves by utilizing an adjustable hanger body, provides for use with posts of different separations with a single piece construction by providing a variety of post grooves, either of the same or differing diameters. This embodiment is thus configured for use in a variety of different vehicles or applications. Aside from this adjustability aspect, the operation and construction of this embodiment of the present invention is similar to the other embodiments. It may comprise one or more hanging means, going to the front or back of the seat, and may comprise, if desired, to aid in installation.

As seen in FIG. 13, head rest mounted hanger 1 comprises hanger body 3 and first, second, third and fourth hanging means 75, 77, 79 and 81 which are integrally molded or otherwise suitably mounted to hanger body 3. Hanger body 3 also comprises a plurality of post grooves, corresponding pairs which are labeled A-A, B-B, etc., for engagement with the head rest posts of varying diameters and separations. Typical separations and diameters might be as follows:

| Post Grooves | Diameter (mm) | Separation (mm) |
|---|---|---|
| A—A | 10 | 180 |
| B—B | 12 | 190 |
| C—C | 10 | 171 |
| D—D | 12 | 178 |
| E—E | 10 | 205 |
| F—F | 12 | 160 |
| G—G | 10 | 150 |
| H—H | 12 | 240 |

Pairs of cutouts may be used in any combination of suitable diameters and separations as desired for the required application, and corresponding pairs may be on the same sides or opposite sides of the hanger body. The embodiment preferably comprises a sufficient number of post grooves to allow for installation in a variety of different vehicles, and as shown comprises matching pairs on opposite sides of the hanger body.

Turning to FIG. 14, the seventh embodiment of head rest mounted hanger 1 is shown in side view. First and second hanging means 75 and 77 project to the front and rear, respectively, of the seat. Turning to FIG. 15, the seventh embodiment of the present invention head rest mounted hanger 1 is shown installed on the head rest of the passenger seat of an automobile.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

I claim:

1. A head rest mounted hanger comprising:
   a hanger body;

a plurality of hanger means, said hanger means connected to said hanger body; and a plurality of circular post grooves shaped for engagement with the posts of a head rest, said post grooves connected to said hinge body, said post grooves having a variety of different diameters.

2. A head rest hanger comprising:

a hanger body;

first and second substantially circular post grooves shaped for engagement with two posts of a head rest, said first and second post grooves connected to said hanger body;

a plurality of hanging means;

said hanging means connected to said hanger body;

third and fourth substantially circular post grooves for engagement with two posts of a head rest, said third and fourth post grooves being of a different diameter than said first and second post grooves.

3. A head rest mounted hanger comprising:

an inner member;

an outer member, said outer member capable of slidable engagement with said inner member;

a first substantially circular post groove for engagement with a post of a head rest, said first post groove connected to said inner member;

a second substantially circular post groove for engagement with a post of a head rest, said second post groove connected to said outer member;

a plurality of hanger means, said hanger means connected to said outer member; and third and fourth post grooves for engagement with two posts of a head rest, said third and fourth post grooves being of a different diameter than said first and second post grooves.

* * * * *